(12) United States Patent
Grapov et al.

(10) Patent No.: US 8,913,861 B2
(45) Date of Patent: Dec. 16, 2014

(54) BEAM COUPLER ALIGNMENT SYSTEM AND METHOD

(71) Applicants: Yuri Grapov, Sutton, MA (US); Michael Digiantomasso, Oxford, MA (US); Bill Jones, Worcester, MA (US)

(72) Inventors: Yuri Grapov, Sutton, MA (US); Michael Digiantomasso, Oxford, MA (US); Bill Jones, Worcester, MA (US)

(73) Assignee: IPG Photonics Corporation, Oxford, MA (US)

( * ) Notice: Subject to any disclaimer, the term of this patent is extended or adjusted under 35 U.S.C. 154(b) by 0 days.

(21) Appl. No.: 13/968,956

(22) Filed: Aug. 16, 2013

(65) Prior Publication Data

US 2013/0336616 A1 Dec. 19, 2013

(51) Int. Cl.
*G02B 6/26* (2006.01)
*G02B 6/42* (2006.01)

(52) U.S. Cl.
CPC ............ *G02B 6/4228* (2013.01); *G02B 6/4204* (2013.01); *G02B 6/4296* (2013.01)
USPC .................... 385/52; 385/33; 385/62

(58) Field of Classification Search
CPC ... G02B 6/4228; G02B 6/4204; G02B 6/4296
USPC .................... 385/33, 62, 74, 93, 52
See application file for complete search history.

(56) References Cited

U.S. PATENT DOCUMENTS

| | | | | |
|---|---|---|---|---|
| 5,039,193 A | * | 8/1991 | Snow et al. ..................... | 385/25 |
| 5,371,814 A | * | 12/1994 | Ames et al. ..................... | 385/25 |
| 5,668,899 A | * | 9/1997 | Jadrich ........................... | 385/33 |
| 6,678,447 B1 | * | 1/2004 | Barker et al. ................... | 385/47 |
| 6,749,344 B2 | * | 6/2004 | Hamm et al. .................... | 385/72 |
| 7,239,776 B2 | * | 7/2007 | Oosterhuis et al. ............. | 385/25 |
| 7,794,159 B2 | * | 9/2010 | Grapov et al. .................. | 385/94 |

\* cited by examiner

*Primary Examiner* — Ellen Kim
(74) *Attorney, Agent, or Firm* — Yuri Kateshov, Esq.; Timothy J. King, Esq.

(57) ABSTRACT

A beam coupler alignment system for a fiber laser system is disclosed. The system includes a focus adjust collimator assembly having an inner and outer housing assembly portion. The inner assembly includes a coupler housing assembly and a modified lens housing received within and adjustable relative to via a mechanism configured and arranged to apply an asymmetric binding force in a predictable and repeatable manner. A lever assembly contacts the lens housing and exerts an off-center (asymmetric) force relative to coupler housing assembly creating a friction bind eliminating X and Y axis movement yet allowing Z axis movement with minimal effort. The assembly may further include an alignment mechanism configured and arranged to optically align an input collimator unit and an output collimator unit of a complex fiber laser system about a common optical axis using the proposed assembly.

20 Claims, 5 Drawing Sheets

BEAM COUPLER ALIGNMENT SYSTEM AND METHOD

BACKGROUND OF THE DISCLOSURE

1. Field of the Disclosure

The present disclosure relates to the use of beam couplers in laser systems. More specifically, the present disclosure relates to a beam coupler configured with an easily adjustable focus.

2. Description of the Related Art

Referring now to FIGS. 1 and 2 conventional adjustable output collimator 10 contains an inner collimator housing assembly 1 with a lens housing 7 in an outer collimator housing 3 having a cylindraceous shape. Adjustable collimator unit 10 is housed in a conventional coupler housing (not shown) of a fiber laser system. Such coupler housings have side walls and are configured and arranged to receive conventional input and output collimator units 10 respectively (again not shown) for the purpose of alignment of respective fiber laser beams. FIG. 2 represents a sectional view along line 2-2 in FIG. 1.

In a conventional alignment process, fine pitch adjust screw 4, 5, and 6 allow respective X, Y, and Z axis adjustment of inner collimator housing 1 relative to outer collimator housing 3 in a difficult manner. To adjust respective X, Y, and Z axis of housing 10, and align a beam along direction A (FIG. 2) all three screws 4, 5, and 6 are used in repetitive cycle. X and Y direction involve the turning (clock wise or counter clock wise) of respective screws 4 and 5. To adjust the Z axis (focus adjust) the X, Y, and Z axis screws must be turned in equal amounts individually. Necessarily, this process causes continuous X and Y axis misalignment for each change in Z axis, which, in turn, results in a further requirement for continuous refocus. Due to mechanical limits, such refocus alignment processes include repeated steps of X, Y, refocus Z (all in equal amounts); X, Y, refocus Z (again in equal amounts), and so on until both alignment and focus of the lens and the beams occurs in the fiber laser beam.

The demands with regard to the ruggedness of laser beam couplers assembly necessitate a configuration that allows for aligning fiber components in a time-efficient manner. What is not appreciated by the prior art is the integration of assembly technique with the efficiency required to maintain economic advantage.

Accordingly, there is a need for an improved beam coupler alignment system and method allowing a time-efficient aligning procedure.

ASPECTS AND SUMMARY OF THE DISCLOSURE

The present patent document solves the problems of the prior art by providing a coupler assembly for a fiber laser that includes a lens housing adjustment system to maintain an X and Y axis adjustment while allowing Z direction motion with little effort. This is accomplished by creating a bind condition which can be accomplished by several methods. In one method, an off-center (asymmetric) load is applied to an inner lens housing to secure (bind) the lens housing in a coupler housing assembly in a predictable and repeatable and releasable manner eliminating X and Y axis movement while allowing continuous single screw Z axis adjustment. The system and method further allow adjustment of the asymmetric load by a mechanism configured and arranged to allow optical alignment of an input collimator unit and an output collimator unit about a common optical axis.

Furthermore, a collimator unit for a fiber laser is provided that includes easily adjustable optical components. Specifically, the focus adjust collimator may include an adjustable inner coupler housing assembly having a mount configured and arranged to secure an optical fiber. An inner housing within the outer housing and secures a lens assembly optically alignable with the optical fiber secured in respective input and output collimator units (only one unit shown). The adjustment mechanism further comprises at least one adjustment screw and a focus lever having a pivot; and, wherein, the adjustment screw is threadably extendable and retractable relative to the lens assembly.

The above, and other aspects, features and advantages of the present disclosure will become apparent from the following description read in conjunction with the accompanying drawings, in which like reference numerals designate the same elements.

SPECIFIC DESCRIPTION OF THE DISCLOSURE

Figure 1:
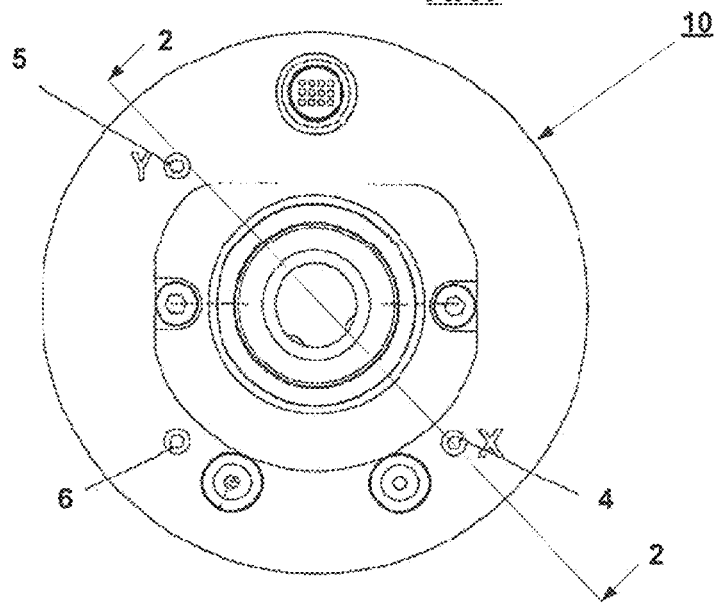
FIG. 1 is a front view of a conventional adjustable output collimator.
Figure 2:
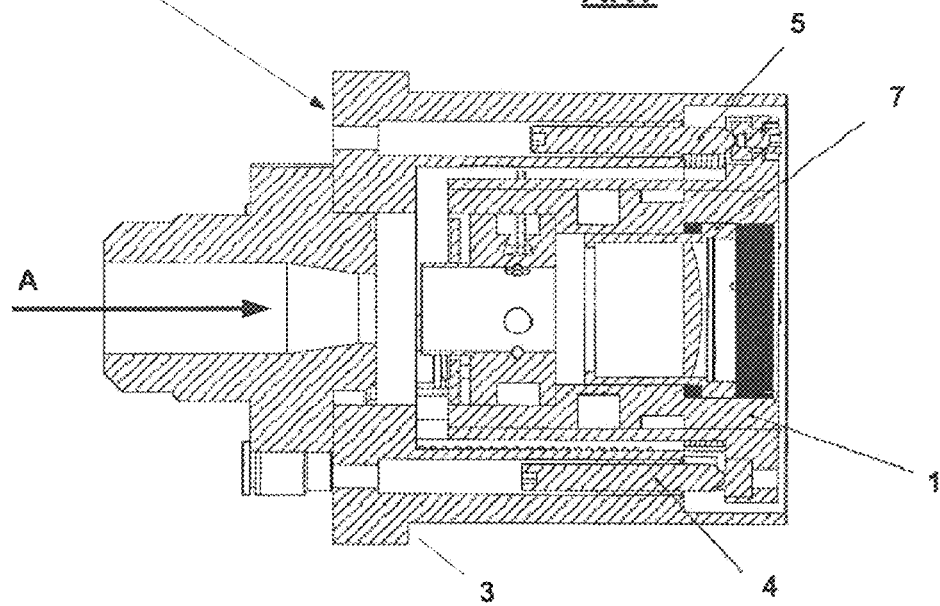
FIG. 2 is a cross sectional view along line 2-2 in FIG. 1 of a conventional adjustable output collimator.
Figure 3:
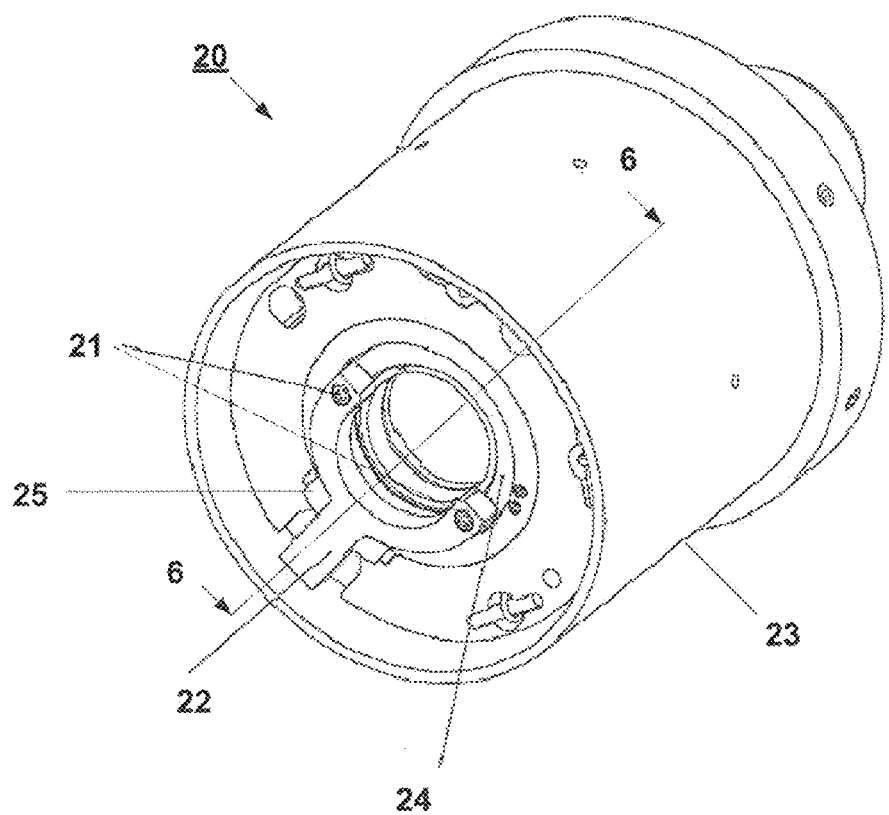
FIG. 3 is a perspective view of a focus adjust collimator unit.
Figure 4:
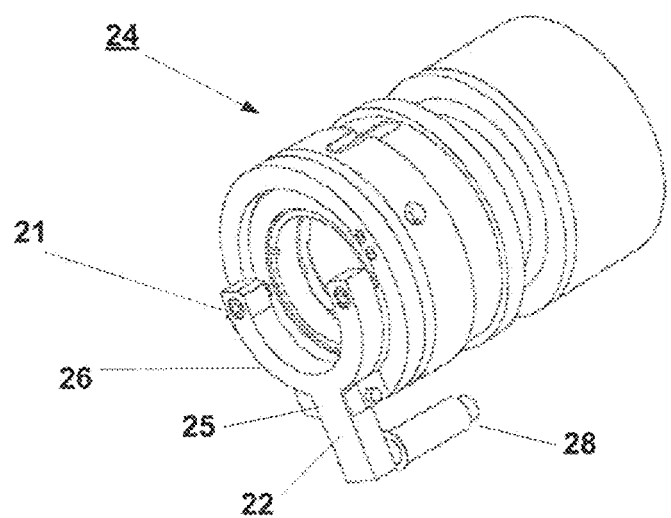
FIG. 4 is a perspective view of a combined lens housing and inner collimator housing assembly.
Figure 5:
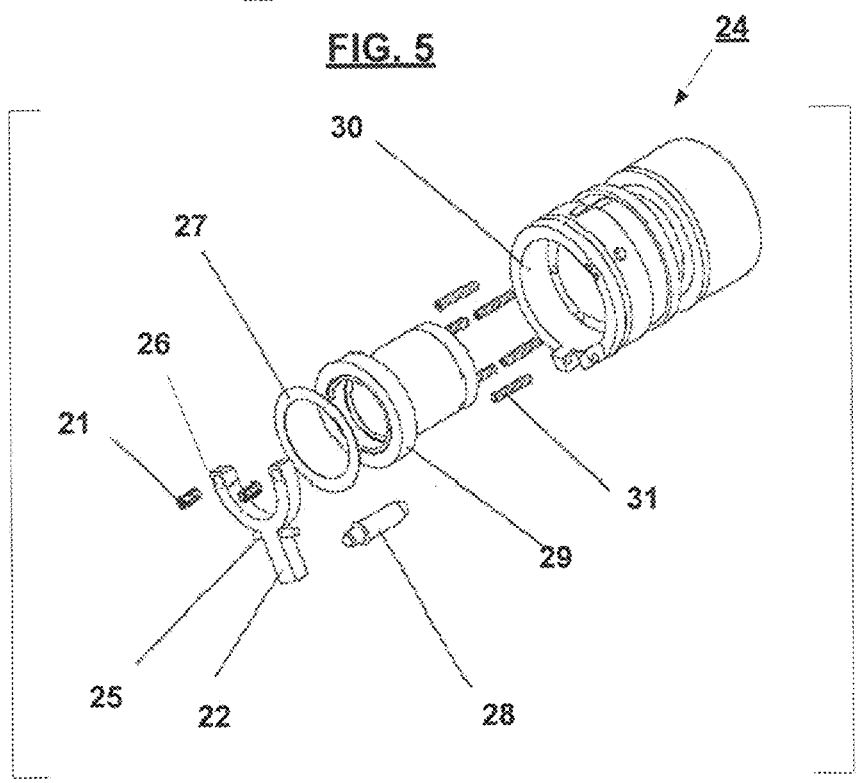
FIG. 5 is an exploded perspective view of FIG. 4.

Reference will now be made in detail to several embodiments of the disclosure that are illustrated in the accompanying drawings. The drawings are in simplified form and are not to precise scale. The words "connect," "couple," and similar terms with their inflectional morphemes do not necessarily denote direct and immediate connections, but also include connections through mediate elements or devices.

Turning first to FIGS. 3 through 7, there is shown a focus adjust collimator 20 having an outer collimator housing assembly 23 and an inner collimator housing assembly 24. Focus adjust collimator 20 adaptively receives a fiber laser (not shown along direction A (FIG. 6) during a use requiring an alignment of the fiber laser with a second fiber laser (also not shown). Inner collimator housing assembly 24 includes a lens housing 29 and a coupler housing assembly 30 (see FIG. 5), and is provided with a focus adjust lever portion 22 of split-arm yoke 26 operable and adjustable relative to a pivot 25. Focus adjust lever 22 may be provided in any adaptive configuration but is shown here as part of split-arm yoke 26 configuration having at least one ball ended set screw 21 as an adjustable contact member at a distal end proximate lens housing 29. Focus adjust lever 22 may also be in a single-arm shape, a curved shape (not shown), or even a circular yoke shape (all not shown) sufficient to allow adjust lever 22 to operate relative to lens housing 29 to provide both an asymmetric binding force thereto during use thus preventing misalignment of X and Y adjustments, and while allowing sliding Z axis movement with little effort.

Figure 6:
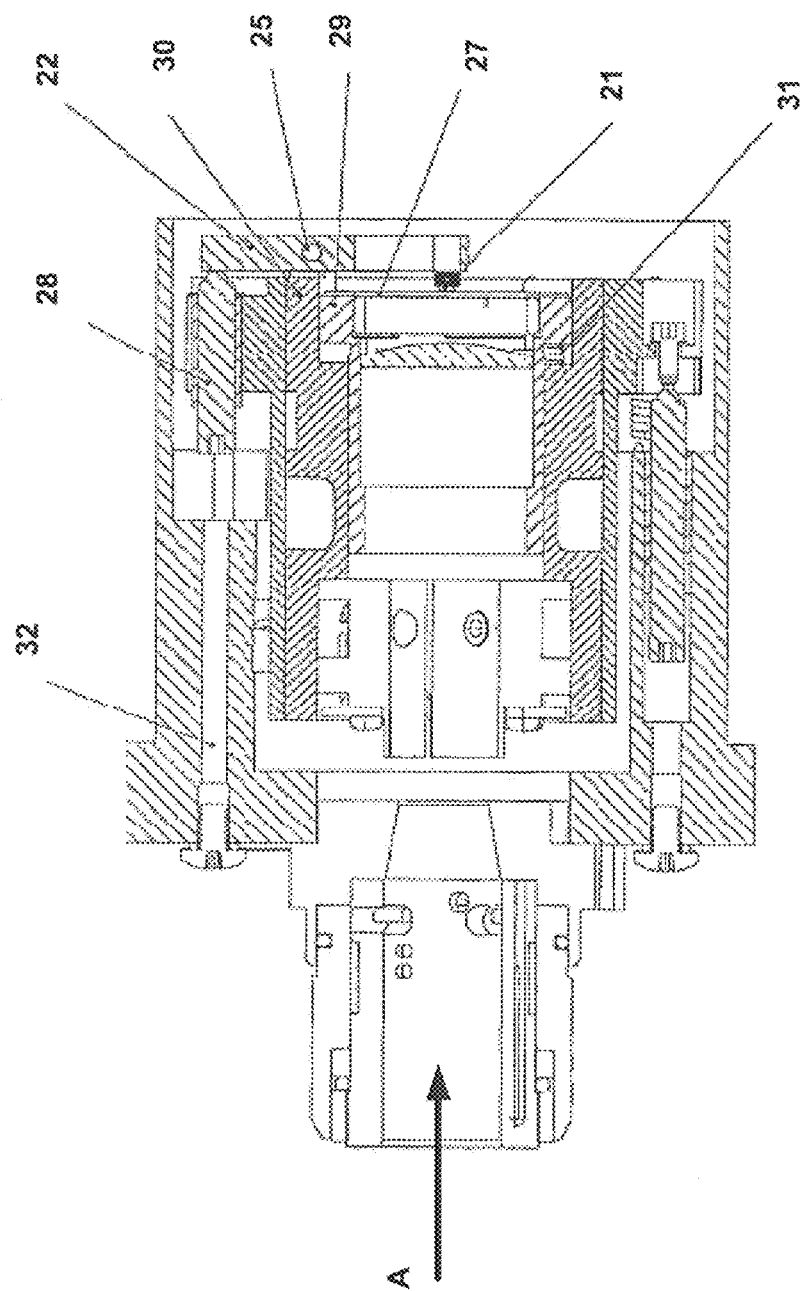
FIG. 6 is a cross sectional view along line 6-6 in FIG. 3.

Lens housing 29 is slidable within coupler housing assembly 30 relative to a beam direction A and has a very close tolerance therein. A plurality of compression springs 31 provide a uniform urging force between coupler housing assembly 30 and an inner surface of a protruding annular portion of lens housing 29, following assembly. A hardened ring member 27, as a force bearing member, is on an outer surface of the protruding annular portion in a force bearing contact with ends of one or more ball ended set screws 21 to receive a contact therefrom. Set screws 21 are threadably adjustable within apertures of yoke 26 on focus adjust lever 22 to provide an operative asymmetrical adjustment and contact relative to hardened ring 27. Either or both set screws 21 may be adaptively used to contact hardened ring 27 on lens housing 29 and exert force thereon. If the screw positions are off center (FIG. 7) relative to a center line of lens housing 29, then either or both screws may be used to induce asymmetrical loading (a bind). Where the screw positions are aligned with a center line (FIG. 6) then only one screw may be used to induce asymmetrical loading (force application). In either operation the mechanism is aided by the set of compression springs 31 to cause an urging pressure to operatively resist that exerted by focus adjust lever 22. Focus adjust lever 22 is pivotaby operative about a pivot 25 via a fine pitch adjustment screw and bushing assembly 28 in outer housing 23 accessible via a access opening 32 in outer collimator housing 23 (FIG. 6). During a use, as assembly 28 is adjusted lever 22 moves lens housing 29 linearly in the Z axis direction without change in the X and Y axis relative to fiber laser axis A.

Figure 7:
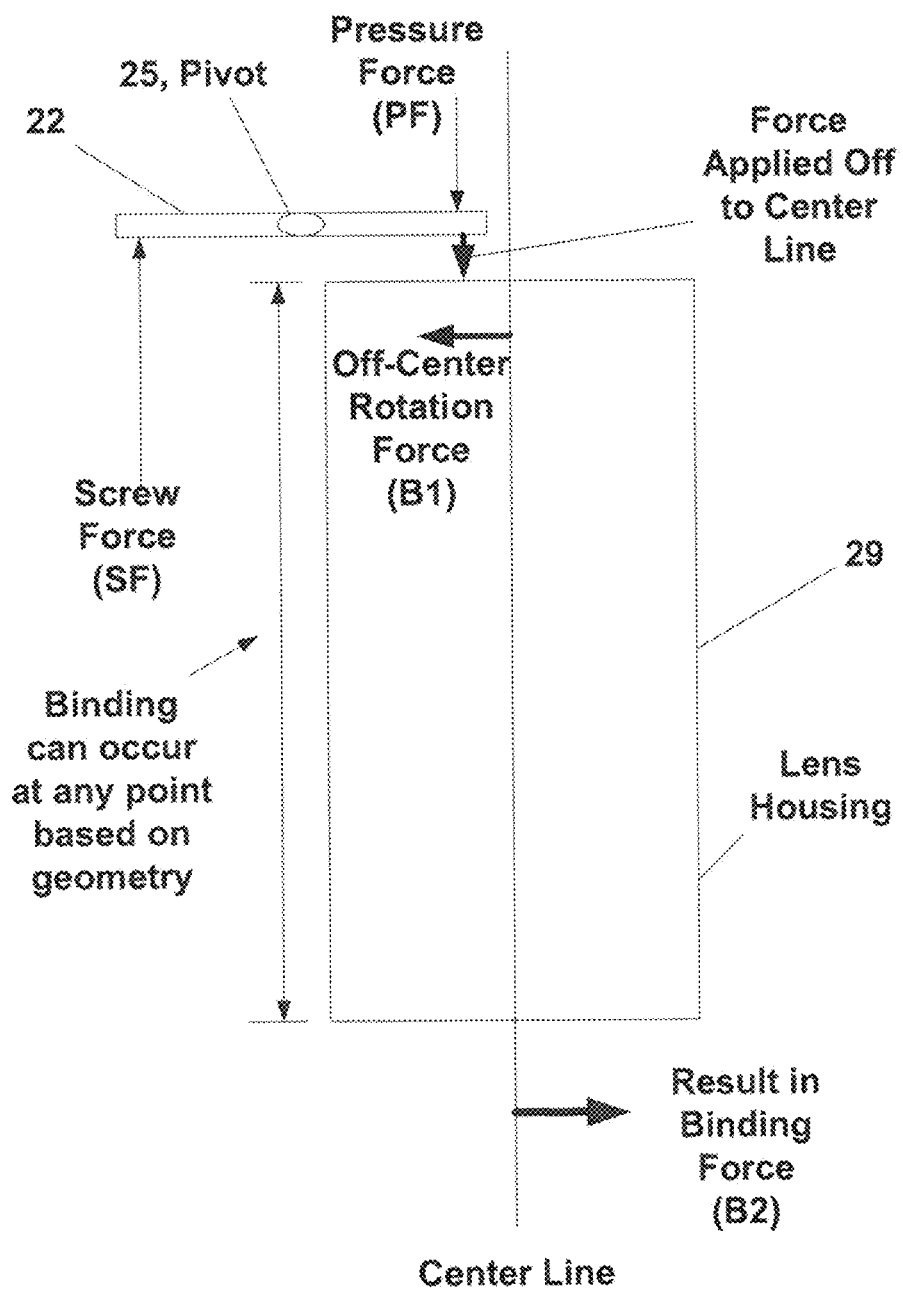
FIG. 7 is an illustrative diagram of the asymmetric force loading according to the present system and method.

Referring to illustrative diagram FIG. 7, the asymmetrical loading mechanism provides a preloaded linear movement in a pressure force (PF) on lens housing 29 relative to a center line causing a very slight off-center misalignment force (B1) and a responsive binding force (B2) when lens housing 29 binds in coupler housing assembly 30 thereby preventing misalignment of an X axis and Y axis adjustment while allowing a linear Z axis movement relative to coupler housing assembly 30. The off-center force (B1) and responsive binding force (B2) are related to pressure force (PF) which, in turn, is the result of a screw force (SF) exerted along focus adjust lever portion 22 of yoke 26 according to the configuration and arrangement of the proposed disclosure. The resulting 'bind' condition is the result of contact between an outer surface of lens housing 39 and an inner surface of coupler housing assembly 30. This contact provides a friction resistance to change in X and Y axis direction while allowing a sliding Z axis adjustment. Therefore, during use the binding force is releasable and adjustable as needed by a user.

Those of skill in the art will recognize that modifying the geometry and length of lever portion 22, yoke 26, distance of screw 21 contact from the centerline, and other elements of the present disclosure allow relative adaption without departing from the scope and spirit of the present disclosure.

Those of skill in the art will further recognize that the proposed beam coupler alignment system further supports a method for beam coupler alignment. In use, a fiber laser (not shown) is inserted in a bayonet type mechanism along direction A (FIG. 6) in a focus adjust collimator assembly 20 inner collimator housing assembly 24 is configured with a coupler housing assembly 30 and a lens housing operably adjustable relative thereto with focus adjust lever 22, as discussed above. Thus, in a first step following insertion of a fiber laser, an X and Y axis adjustment occurs. Third, the focus adjust lever 22 mechanism is used to apply an asymmetric force on lens housing creating a slight bind condition to eliminate further X and Y axis movement. Forth, focus adjust lever is operated to adjust Z axis focus.

Those of skill in the art will recognize that the proposed disclosure provides an asymmetric alignment mechanism or system configured and arranged to align a collimator unit of a fiber laser system about a desired central axis using an asymmetric practice. Those of skill in the art will also recognize that the proposed disclosure provides a system for aligning an input collimator assembly and an output collimator assembly about a common central axis in a fiber laser system in a time-efficient manner. Those of skill in the art will further recognize that the phrase asymmetric will be broadly understood to indicate application of a force of the center of the housing thus inducing asymmetrical loading.

It will be appreciated by those of skilled in the art that various changes and modifications can be made to the illustrated embodiments without departing from the spirit of the present disclosure. All such modifications and changes are intended to be within the scope of the present disclosure except as limited by the scope of the appended claims.

What is claimed is:

1. A beam coupler alignment system for a fiber laser, comprising:
   an outer housing configured to secure an optical fiber thereto;
   an inner housing received within the outer housing;
   the inner housing further comprising a concentric coupler housing assembly and an adjustably retained lens housing received therein about a common central axis; and
   an asymmetric adjustment mechanism configured and arranged between the outer housing and the lens housing to adjustably bind the lens housing relative to the coupler housing assembly during an alignment of the system.

2. The beam coupler alignment system of claim 1, wherein:
   the asymmetric adjustment mechanism further comprising:
   a pivot arm member pivotably coupled to the coupler housing assembly and arranged to adjustably bind the lens housing thereto.

3. The beam coupler alignment system of claim 2 further comprising
   at least one contact member adjustably extending from the pivot arm member to the lens housing and exerting an urging asymmetric force thereon during the alignment.

4. The beam coupler alignment system of claim 2 further comprising:
   a spring assembly between the lens housing about an inner lip thereof and an outer portion of the coupler housing assembly; and
   the spring assembly configured and arranged opposite the pivot arm member to provide an urging between the coupler housing assembly and the lens housing.

5. The beam coupler alignment system of claim 4 further comprising
   an adjustment member in the outer housing configured to provide an adjustable force on the pivot arm member distal to the lens housing counter to the urging provided by the spring assembly thereby enabling the alignment of the system.

6. The beam coupler alignment system of claim 3 further comprising:
   a force bearing member on the lens assembly configured proximate the at least one contact member and arranged to receive force from the at least one contact member.

7. The beam coupler alignment system of claim 2 further comprising:
   at least two extending ends of the pivot arm member configured proximate opposing outer portion of the lens assembly, each the extending end further comprising:
   at least one contact member extending from the pivot arm member to the lens housing and exerting an urging asymmetric force thereon during the alignment.

8. A focus adjustable collimator unit for a fiber laser, comprising:
   an outer housing configured to secure an optical fiber thereto;
   an inner housing received within the outer housing;
   the inner housing further comprising a concentric coupler housing assembly and an adjustably retained lens housing received therein; and
   an asymmetric adjustment mechanism configured and arranged between the outer housing and the lens housing to releasably and adjustably bind the lens housing relative to an inner surface of the coupler housing assembly during a focus alignment of the system.

9. The focus adjustable collimator unit of claim 8 further comprising:
   a pivot mechanism in the asymmetric adjustment mechanism;
   the pivot mechanism pivotably coupled to the coupler housing assembly and arranged to adjustably urge the lens housing in an asymmetric direction during the focus alignment.

10. The focus adjustable collimator unit of claim 9 further comprising:
   a spring assembly mechanism configured between the lens housing and the coupler housing assembly to provide a separation urging between the coupler housing assembly and the lens housing.

11. The focus adjustable collimator unit of claim 9 further comprising:
   at least one yoke member extending from the pivot mechanism away from a pivot point proximate the coupler housing assembly toward an outer edge of the lens housing.

12. The focus adjustable collimator unit of claim 11 further comprising:
   at least one contact member adjustably extending from the yoke member in a contact direction relative to the outer edge of the lens housing.

13. The focus adjustable collimator unit of claim 12 further comprising:
   a threadable adjustment mechanism coupled to the pivot mechanism distant from the yoke member arranged to adjust the pivot mechanism relative to the outer housing during the focus alignment of the system.

14. A method for adjusting a collimator unit for a fiber laser, comprising the steps of:
   securing an optical fiber to an outer housing;
      the outer housing further comprising an inner housing received therein and the inner housing further comprising:
         a concentric coupler housing assembly and an adjustably retained lens housing received therein relative to a common central axis; and
         an adjustment mechanism configured and arranged between the outer housing and the lens housing to adjustably hind the lens housing relative to the coupler housing assembly during an alignment of the system in an asymmetric manner;
   adjusting a X axis alignment;
   adjusting a Y axis alignment;
   operating the adjustment mechanism to place the lens housing in a releasable bind position on an interior surface of the coupler housing so as to fax the X axis adjustment and the Y axis adjustment; and
   adjusting a Z axis alignment to achieve a focus of the fiber laser, whereby the method enables a concentric alignment of an output of the fiber laser with the lens housing in a simple manner.

15. The method for adjusting a collimator unit of claim 14, wherein:
   the step of operating the adjustment mechanism further comprising the steps of:
      adjusting at least one contact member relative to a pivot arm member pivotally coupled to the coupler housing assembly.

16. The method for adjusting a collimator unit of claim 15, wherein:
   the step of operating further comprises the step of:
      threadably applying a pivot force applied to the pivot arm relative to the outer housing.

17. The method for adjusting a collimator unit of claim 14, wherein:
   the step of operating the adjustment mechanism further comprises the step of applying a force to a side portion of the lens housing in an asymmetric manner relative to the central axis.

18. The method for adjusting a collimator unit of claim 17 further comprising the steps of:
   arranging a spring assembly between the lens housing about an inner lip thereof and an outer portion of the coupler housing assembly; and
   during the step of adjusting the Z axis providing, with the spring assembly, an urging between the coupler housing assembly and the lens housing to resist the adjustment.

19. The method for adjusting a collimator of claim 14, wherein:
   the step of operating the adjustment mechanism to place the lens housing in a releasable bind position includes a step of moving the lens in an asymmetric manner.

20. The method for adjusting a collimator of claim 19, further comprising the steps of:
   releasing the bind position of the lens in the coupler housing;
   readjusting an X axis alignment;
   readjusting a Y axis alignment;
   reengaging the adjustment mechanism to place the lens housing in the releasable bind position; and
   readjusting a Z axis alignment to achieve a focus.

\* \* \* \* \*